Figure 1:
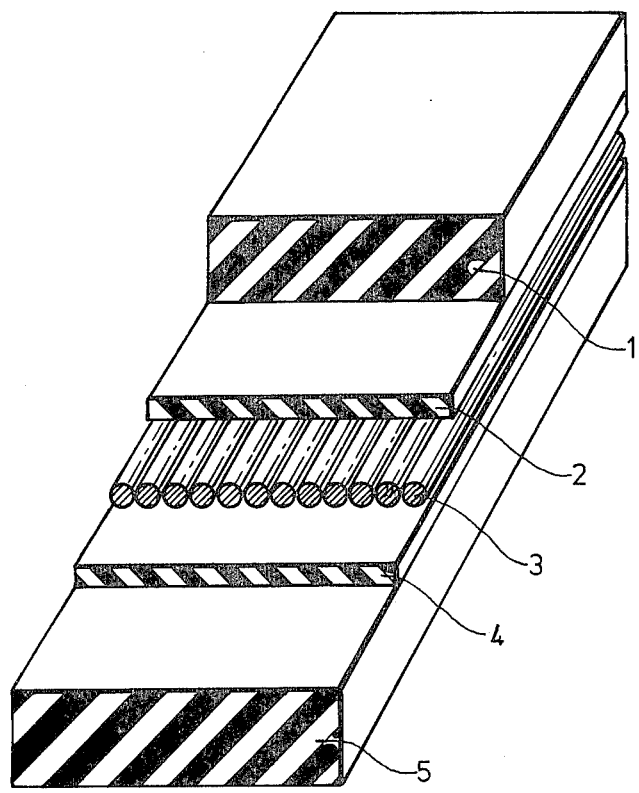

United States Patent [19]

Mirza

[11] Patent Number: 4,486,477

[45] Date of Patent: Dec. 4, 1984

[54] PROCESS FOR THE PRODUCTION OF RUBBER ARTICLES REINFORCED WITH STEEL CORDS

[75] Inventor: Jean Mirza, Odenthal, Fed. Rep. of Germany

[73] Assignee: Bayer AG., Fed. Rep. of Germany

[21] Appl. No.: 507,147

[22] Filed: Jun. 23, 1983

[30] Foreign Application Priority Data

Jul. 2, 1982 [DE] Fed. Rep. of Germany ....... 3224785

[51] Int. Cl.³ ........................... B05D 3/02; B60C 5/00
[52] U.S. Cl. .................................. 427/388.1; 156/910; 156/124; 152/359
[58] Field of Search ................. 156/910, 174; 152/359; 427/388.1, 388.2

[56] References Cited

U.S. PATENT DOCUMENTS

| | | | |
|---|---|---|---|
| 3,629,038 | 12/1971 | Satake | 152/359 |
| 4,068,041 | 1/1978 | Swarts | 427/388.2 |
| 4,172,912 | 10/1979 | Noji | 427/388.2 |
| 4,255,496 | 3/1981 | Haemers | 152/359 |

OTHER PUBLICATIONS

Imoto, Analysis of Chemical Structures of Combined Sulfer in Crosslink Sites For Various Vulcanizates, Rubber Chem. & Technology, vol. 43, pp. 424–443, 1970.

*Primary Examiner*—John E. Kittle
*Assistant Examiner*—James J. Seidleck
*Attorney, Agent, or Firm*—Connolly and Hutz

[57] ABSTRACT

Rubber articles which consist of a brass-plated steel cord, or a steel cord which is provided with an alloy layer, and a peroxidically cross-linkable rubber exhibit a good adhesion when the steel cord is sheathed with a rubber mixture B which contains sulphur or a sulphur donor and has a layer thickness ≦3 mm, a peroxide-containing rubber mixture A is then applied to the rubber mixture B, and the layers are vulcanised together at a temperature of from 130° to 220° C.

11 Claims, 1 Drawing Figure

PROCESS FOR THE PRODUCTION OF RUBBER ARTICLES REINFORCED WITH STEEL CORDS

Many commercial rubber articles, for example conveyor belts or high-pressure hoses, are provided with reinforcing inserts of steel which has a high carbon content and is often used in the form of steel cords.

A strong and lasting bond between metal and rubber is necessary in order to ensure a good efficiency and life of the articles.

This may only be readily achieved if the filaments of the steel cord are plated with a thin layer of α-brass or with another alloy having copper and zinc as the main constituents or with pure zinc.

The cord thus treated is directly vulcanised into the rubber mixture which usually contains particularly adhesion-promoting additives.

The adhesion between the brass-plated steel cord and the rubber is usually caused by the sulphur which is present as a vulcanising agent in the rubber to be vulcanised. Under vulcanisation conditions, this sulphur also reacts with the brass or alloy layer, with the formation of copper sulphides and/or zinc sulphides, and in this manner causes adhesion of the steel cord to the cross-linked rubber.

If rubbers are used which may be cross-linked with peroxides, the adhesion process which has been described does not occur, because sulphur is not available as an adhesive. It is also impossible to add sulphur as a mixture component to the peroxidically cross-linkable rubbers, because undesirable reactions take place between sulphur and the peroxides which lead to considerable disruption of the cross-linking of the rubber.

There is a need in this technology to provide peroxidically cross-linkable rubbers with reinforcing steel inserts, and a good adhesion between steel and rubber must be provided.

This need may be satisfied by the following teaching according to the present invention.

The fact that sulphur severely disturbs the peroxidic cross-linking process leads to the conclusion that sulphur and peroxides must not both be present in the same rubber mixture. Therefore, it is necessary to use sulphur and peroxides respectively in two separate mixtures, so that they are able to react in each case at the vulcanisation temperature without adversely affecting one another.

FIG. 1 illustrates a rubber which is reinforced with steel cord.

This rubber comprises an outer sheath (1) and (5) consisting of a rubber mixture A which is cross-linked peroxidically, and an underlying layer (2) and (4) consisting of a rubber mixture B which contains sulphur or a sulphur donor and causes adhesion to the brass-plated or otherwise alloyed steel cord (3) by a reaction of the sulphur with the brass or with the alloy.

Bonding between the layers A and B is produced by migration of the peroxide from the mixture A into the mixture B, whereby a peroxidic cross-linking process take places in both mixtures.

The following conditions should be observed for the reinforced rubber in the drawing to be effective:

(a) the selection of a peroxide (or peroxide system) which is at least partly soluble in the polymer and the decomposition temperature of which lies above the temperature at which sulphur reacts with brass. Consequently, the cross-linking action of mixture A only takes place once the adhesion between mixture B and the steel cord has occurred.

(b) Correct metering of the sulphur or of a sulphur donor which, in excess, would prevent a subsequent cross-linking of mixture B.

(c) Correct metering of the peroxide in order adequately to cross-link mixture B.

(d) Adjustment of mixture B in a sufficiently thin layer (either as a film or as a solution) to allow an optimum penetration of the peroxide and to ensure a regular cross-linking of the complete layer thickness.

Thus, the present invention provides a process for the production of reinforced rubber articles consisting of a brass-plated steel cord or a steel cord provided with an alloy layer, and a peroxidically cross-linkable rubber, characterised in that the steel cord is sheathed with a rubber mixture B which contains from 0.5 to 10 parts by weight of sulphur or a corresponding amount of a sulphur donor, based on 100 parts by weight of rubber in the rubber mixture B, and has a layer thickness of $\leq 3$ mm; a rubber mixture A is then applied to the rubber mixture B, the mixture A containing from 1 to 15 parts by weight of a peroxide, based on 100 parts by weight of rubber in the rubber mixture A, and the peroxide having a decomposition point above 130° C.; and the layers are vulcanised together at a temperature of above 130° to 220° C.

The steel cord which is used has a standard diameter. Depending on the area of use, it may be used as a single strand or in a bundle. Brass is the preferred alloy.

The rubber mixture B preferably contains the following polymers: butadiene rubber, chlorinated polyethylene, chlorosulphonated polyethylene, ethylene-propylene-diene polymer, ethylene-propylene-bipolymer, ethylene-vinylacetate, fluorocarbon polymers, isoprene rubber, acrylonitrile-butadiene-copolymer which may be completely or partly hydrogenated or carboxylated, natural rubber, silicone rubber, styrene-butadiene rubber which may also be carboxylated, and a terpolymer of vinyl acetate, butyl acrylate and acrylonitrile.

The rubbers may be cross-linked peroxidically. Chlorinated polyethylene is a preferred polymer.

The rubbers may also contain conventional auxiliaries provided such auxiliaries do not prevent the reaction between the sulphur and the surface of the steel cord and also do not disturb the peroxidic cross-linking of the rubber. The following are mentioned by way of example: stabilizers, such as MgO; fillers, such as carbon black, chalk and/or plasticizers.

The quantity of sulphur, based on 100 parts by weight of the rubber in the rubber mixture B, is preferably from 3 to 6 parts by weight, in particular from 4 to 5 parts by weight.

The layer thickness of the rubber mixture B on the steel cord is preferably from 0.01 to 2 mm, in particular from 0.5 to 1 mm.

The rubber mixture B is applied to the steel cord in a manner known to a man skilled in the art. For example, the steel cord may be guided through a dipping bath of B, or strips of the rubber mixture B are wound round the steel cord, or the cord is extrusion-coated in an extruder.

The rubber mixture A may consist of the same polymers which are specified for the rubber mixture B.

However, this does not mean that the rubber mixtures A and B always contain identical polymers, since the polymers may be completely different. Thus, for example, mixture A and mixture B may consist of chlorinated polyethylene as the polymer in each case. However, mixture B could consist of, for example, chlorinated polyethylene and mixture A could consist of EPDM rubber. Chlorinated polyethylene is the preferred rubber for the rubber mixture A.

The rubber mixture A may also contain auxiliaries which do not prevent the peroxidic cross-linking process. The following are mentioned by way of example: fillers, such as carbon black or chalk; stabilizers, such as MgO or lead oxide; and/or plasticizers.

Examples of peroxides which are used in the rubber mixture A include the following: 1,1-bis(tert.-butyloxy)-3,3,5-trimethylcyclohexane, t-butyl perbenzoate, 3,3-bis-(t-butylperoxy)butane carboxylic acid-n-butylester, dicumyl peroxide and 1,3-bis-(t-butyl-peroxyisopropyl)-benzene.

Activators, such as triallylcyanurate or triallylisocyanurate, may also be added in conventional quantities to the peroxides or to the peroxide mixture.

The quantities of peroxide in the rubber mixture A preferably amount to from 3 to 10 parts by weight, in particular from 5 to 8 parts by weight, per 100 parts by weight of rubber.

The rubber mixture A is applied to the rubber mixture B in a conventional manner, for example by encasing or by extrusion-coating.

Vulcanisation takes place under pressure using conventional vulcanisation methods, for example steam, hot air and pressing in conventional machines.

The vulcanisation temperature which is applied is preferably from 150° to 190° C.

The product which is obtained according to the process of the present invention may be used, for example, as a conveyor belt, as a hose, for example for medium, high or maximum pressure, as a V belt, a toothed belt, a driving belt or as a buffer.

EXAMPLES

Summary

The experiments show that the adhesion values which are obtained with sulphur are much higher than, for example, the level which is required for the production of high-pressure hoses according to DIN 20022. They also show that the adhesion after heat ageing and after a dynamic strain is better than the actual tear resistance of the rubber (the surface of the cord is covered with rubber after the adhesion test). The favourable tear profile is to be attributed to the "stabilizing" effect of sulphur which reduces the negative influence of zinc on the ageing resistance of chlorinated polyethylene mixtures by the chemical bond with brass.

Mixture composition

The mixtures A and B which were used to produce the test bodies are specified in Table I. Magnesium oxide was used as a stabilizer in mixture B (instead of the basic lead silicate used in mixture A), so that the desired reaction between sulphur and brass which leads to adhesion is not disturbed.

Structure of test bodies

Mixture A was wound as a film on a construction drum in a total sheet thickness of 3 mm. The brass-plated steel cord (7×3×0.15) was wound closely thereon, after it had been drawn through a preceding solution tank containing a solution of mixture B (solvent perchloroethylene or a mixture of toluene:petrol 1:1; solution ratio 1 part by weight of mixture:5 parts by weight of solvent).

After evaporation of the solvent, three silicone-treated strips of paper were positioned in the axial direction of the drum and then covered with mixture A (total thickness 3 mm).

After the construction drum had been bandaged with wet windings of cotton, vulcanisation was carried out in steam (30 mins/160° C.).

Test bodies having the following dimensions were stamped out of the vulcanised "cylinder":
150 mm×25 mm (separating resistance tested after static storage)
300 mm×25 mm (separating resistance tested after dynamic fatigue).

Testing

In order to provide as much information as possible about the suitability in practice of the rubber-metal bond which is achieved, the adhesion in test bodies was tested before and after heat ageing and after heat ageing and *subsequent* dynamic fatigue.

The separating resistance (according to the peeling test) was tested according DIN 53530. Aged and unaged test bodies were used for the test (24 h and 168 h/150° C.).

The dynamic fatigue test was carried out according to ASTM-D-430-59 (73), method A (Scott Flexing Machine). According to this method, an attempt was to be made to simulate the stress of a reinforced hose in a pulse test to obtain information about the suitability of the rubber-metal adhesion in practical use.

Test bodies (300×25 mm) were used for this purpose which contained at both ends silicone-treated paper strips between the mixture B and the cord. The test bodies were clamped at both ends in the testing apparatus, so that only the middle region (stressed sample length 130 mm) was loaded dynamically. By characterising the dynamically loaded region, the separating resistance values which were established may be clearly allocated to the differently loaded regions.

Results

Adhesion before and after static ageing (Table 2):

The separating resistance measured at 90 N/cm is much higher than the minimum value required for high-pressure hoses according to DIN 20022 (cover: 40 N/cm; core: 25 N/cm).

After ageing (7d/150° C.), the rubber-metal adhesion remains higher with a separating resistance of 46 N/cm than the tear propagation resistance of the rubber.

Adhesion before and after dynamic fatigue (Table 3):

The results of the separating resistance after heat ageing are comparable with those of Table 2.

The tear profile after dynamic fatigue shows that the steel cord surface is covered with rubber after 1,470,000 bends, and premature ageing caused by zinc in the brass cannot be observed on the rubber layer directly adjacent to the brass.

TABLE 1

| Adhesion of chlorinated polyethylene on brass-plated steel cord | | |
|---|---|---|
| Rubber Mixture | A | B |
| Chlorinated polyethylene (Bayer CM 3630) | 100.0 | 100 |
| Magnesium oxide | — | 10.0 |
| Basic lead silicate | 10.0 | — |
| Anti-ageing agent (Vulkanox HS) | 0.2 | 0.2 |
| Carbon black N 762 | 60.0 | 60.0 |

TABLE 1-continued

Adhesion of chlorinated polyethylene on brass-plated steel cord

| | | |
|---|---|---|
| Plasticizer (Reomol LTM) | 20.0 | 20.0 |
| Trialkylcyanurate (TAC) | 4.0 | 4.0 |
| 3,3-bis-(tert.-butylperoxy)butane carboxylic acid-n-butyl ester (Trigonox 17/40) | 7.0 | — |
| Sulphur | — | 4.0 |
| | 201.2 | 198.2 |
| Kneader batch temperature | 125° C. | 125° C. |
| Vulcanisate properties, standard ring I | | |
| F (MPa), 160° C. 30′ | 16.9 | 5.8 |
| D (%), 160° C. 30′ | 395 | 990 |
| S100 (MPa), 160° C. 30′ | 3.2 | 1.5 |
| S300 (MPa), 160° C. 30′ | 14.2 | 3.3 |
| H (Shore A) 160° C. 30′ | 67 | 65 |
| R (%) 160° C. 30′ | 29 | 27 |
| Vulcanisate properties, standard rod II | | |
| F (MPa), 160° C. 30′ | 18.4 | 7.9 |
| D (%), 160° C. 30′ | 375 | 890 |
| S100 (MPa), 160° C. 30′ | 3.4 | 1.8 |
| S300 (MPa), 160° C. 30′ | 15.2 | 3.8 |
| Density (g/cm³) | 1.36 | 1.35 |
| | A | B |

Production of mixtures in an internal mixer GK 5, 32 r.p.m., 60° C., 70% filling of the kneader volume determined using wheat Upside-down mixing process

| Mixing sequence | | Mixing sequence | |
|---|---|---|---|
| 0′ | carbon black N-762, lead silicate, Vulkanox HS, plasticizer Bayer CM 3630 | 0′ | carbon black N-762, magnesium oxide, Vulkanox HS, plasticizer, TAC, Bayer CM 3630 |
| 1½′ | TAC, Trigonox 17/40 | 1½′ | empty |
| 2′ | empty | | |
| Kneader batch temperature | | | |
| 125° C. | | 125° C. | |
| Homogenise: roller 60° C. | | Mix so that ready: roller 60° C. | |
| 0′ | Finished mixture | 0′ | Batch |
| ½′ | Processing | ½′ | Sulphur |
| 3′ | End of processing | 2′ | Processing |
| | | 4′ | End of processing |

TABLE 2

Static adhesion (N/20 mm) and residual adhesion (in %) after heat ageing

| | | |
|---|---|---|
| 0 value | 225(+) | (100%) |
| after 24 h/150° C. | 135(+) | (60%) |
| after 168 h/150° C. | 115(+) | (61%) |

(+)Structural tear in the rubber

TABLE 3

Adhesion (N/25 mm) and residual adhesion (in %) after belt flexion fatigue(++)

| 0 Value | after dynamic fatigue |
|---|---|
| 220 | 215 (98%) after 24 h/RT (about 245.000 strokes) |
| 235 | 230 (98%) after 72 h/RT (about 735.000 strokes) |
| 0 value (after 72 h/ 140° C.) | ... subsequent dynamic fatigue |
| 130 | 120 (92%) after 24 h/RT (about 245.000 strokes) |
| 132 | 120 (91%) after 72 h/RT (about 735.000 strokes) |

TABLE 3-continued

Adhesion (N/25 mm) and residual adhesion (in %) after belt flexion fatigue(++)

| | |
|---|---|
| (++)Belt flexion fatigue according to ASTM D-430-59 (73) Test bodies: Number of bends until layers separate | |
| Test conditions: force K (N) | 333 |
| Deflection rollers-⌀ d (mm) | 30 |
| Stroke frequency n (1/min) | 170 |
| (1 stroke = 2 bends) | |
| Stressed sample length 1E/(mm) | 130 |
| Sample: width b (mm) | 25 |
| Sample: thickness h (mm) | (total with steel cord insert) |
| Sample: length l (mm) | 300 |

Explanations
F = Strength (MPa) according to DIN 53504
D = Elongation at break (%) according to DIN 53504
S = Tension (MPa) according to DIN 53504
H = Hardness (Shore A) according to DIN 53505
R = Impact elasticity (%) according to DIN 53512

I claim:

1. A process for the production of reinforced rubber articles comprising an alloy-coated steel cord reinforcement and a peroxidically cross-linkable rubber selected from the group consisting of chlorinated polyethylene and completely or partly hydrogenated acrylonitrile-butadiene-copolymer, which comprises sheathing the steel cord with a rubber mixture B which contains from 0.5 to 10 parts by weight of sulphur or a corresponding amount of sulphur donor, based on 100 parts by weight of rubber in the rubber mixture B, and has a layer thickness of ≦3 mm; applying a rubber mixture A to the rubber mixture B, which mixture A contains from 1 to 15 parts by weight of a peroxide, based on 100 parts by weight of rubber in the rubber mixture A, the peroxide having a decomposition point of above 130° C.; and then vulcanising the layers together at a temperature of above 130° to 220° C.

2. A process according to claim 1, wherein the alloy is brass.

3. A process according to claim 1 or 2, wherein the quantity of sulphur is from 3 to 6 parts by weight.

4. A process according to claim 1 or 2, wherein the quantity of sulphur is from 4 to 5 parts by weight.

5. A process according to any of claims 1 to 4, wherein the layer thickness of the rubber mixture B on the steel cord is from 0.01 to 2 mm.

6. A process according to any of claims 1 to 4, wherein the layer thickness of the rubber mixture B on the steel cord is from 0.5 to 1 mm.

7. A process according to any of claims 1 to 6, wherein the quantity of peroxide in the rubber mixture A is from 3 to 10 parts by weight.

8. A process according to any of claims 1 to 6, wherein the quantity of peroxide in the rubber mixture A is from 5 to 8 parts by weight.

9. A process according to any of claims 1 to 8, wherein the rubber of the rubber mixture B is chlorinated polyethylene.

10. A process according to any of claims 1 to 8, wherein the rubber of both rubber mixtures is chlorinated polyethylene.

11. A process according to any of claims 1 to 10, wherein the vulcanisation temperature is from 150° to 190° C.

* * * * *